(12) United States Patent
Zhang et al.

(10) Patent No.: US 11,518,203 B2
(45) Date of Patent: Dec. 6, 2022

(54) MULTIFUNCTIONAL EXTERNAL INFLATING VALVE AND MOUNTING METHOD FOR LOADING DEVICE OF INFLATING VALVE

(71) Applicant: HAMATON AUTOMOTIVE TECHNOLOGY CO., LTD., Hangzhou (CN)

(72) Inventors: Jianer Zhang, Hangzhou (CN); Baoer Zhu, Hangzhou (CN)

(73) Assignee: HAMATON AUTOMOTIVE TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 17/618,304

(22) PCT Filed: Jul. 5, 2019

(86) PCT No.: PCT/CN2019/094865
§ 371 (c)(1),
(2) Date: Dec. 10, 2021

(87) PCT Pub. No.: WO2020/248312
PCT Pub. Date: Dec. 17, 2020

(65) Prior Publication Data
US 2022/0234402 A1   Jul. 28, 2022

(30) Foreign Application Priority Data
Jun. 11, 2019  (CN) .......................... 201910499390.4

(51) Int. Cl.
*B60C 29/00*   (2006.01)
*F16K 24/06*   (2006.01)
*F16K 15/20*   (2006.01)

(52) U.S. Cl.
CPC .......... *B60C 29/002* (2013.01); *B60C 29/005* (2013.01); *F16K 24/06* (2013.01); *F16K 15/20* (2013.01); *Y10T 137/3724* (2015.04)

(58) Field of Classification Search
CPC ......... Y10T 137/3724; Y10T 137/3662; Y10T 137/3584; F16K 15/20
See application file for complete search history.

(56) References Cited

U.S. PATENT DOCUMENTS

| | | | | |
|---|---|---|---|---|
| 1,198,205 A | * | 9/1916 | Engstrom | B60S 5/043 285/345 |
| 1,210,538 A | * | 1/1917 | Rose | B60S 5/043 285/310 |

(Continued)

FOREIGN PATENT DOCUMENTS

| | | |
|---|---|---|
| CN | 101144551 A | 3/2008 |
| CN | 201100438 Y | 8/2008 |

(Continued)

*Primary Examiner* — Robert K Arundale
(74) *Attorney, Agent, or Firm* — Muncy, Geissler, Olds & Lowe, P.C.

(57) ABSTRACT

A multifunctional external inflating valve and a mounting method for a loading device are disclosed. An inflating valve body of the inflating valve includes a three-way through main body through from a side surface by a side surface connecting part connecting a loading device. A valve core is arranged in an axial middle hole. A hole cavity is formed in the front portion of the axial middle hole and connected to an original tire inflating valve. An outer conical surface is arranged on the front portion of the valve core. The front portion, comprising the outer conical surface, of the core protrudes out of the front end of the hole cavity of the main body. An core conical surface sealing rubber pipe is mounted on the outer conical surface of the core and seals the core and a conical hole sealing surface of a tire inflating valve inner hole cavity.

9 Claims, 7 Drawing Sheets

(56) References Cited

U.S. PATENT DOCUMENTS

| | | | | |
|---|---|---|---|---|
| 1,482,237 A | * | 1/1924 | Lent | ................... B60C 23/0496 |
| | | | | 137/227 |
| 1,719,902 A | * | 7/1929 | Reaney | ..................... B60S 5/04 |
| | | | | 137/227 |
| 2,451,277 A | * | 10/1948 | Crowley | ................. F16K 15/20 |
| | | | | 137/589 |
| 2,749,931 A | * | 6/1956 | Battin | ..................... F16K 15/20 |
| | | | | 137/234.5 |
| 9,841,145 B1 | | 12/2017 | Powell | |
| 10,245,911 B1 | | 4/2019 | Crymble | |

FOREIGN PATENT DOCUMENTS

| | | |
|---|---|---|
| CN | 204512557 U | 7/2015 |
| CN | 105351579 A | 2/2016 |
| CN | 205207795 U | 5/2016 |
| CN | 207298181 U | 5/2018 |
| CN | 109555927 A | 4/2019 |
| TW | M540761 U | 5/2017 |

\* cited by examiner

MULTIFUNCTIONAL EXTERNAL INFLATING VALVE AND MOUNTING METHOD FOR LOADING DEVICE OF INFLATING VALVE

TECHNICAL FIELD

The present invention relates to the field of inflating valves.

BACKGROUND

Figure 1:
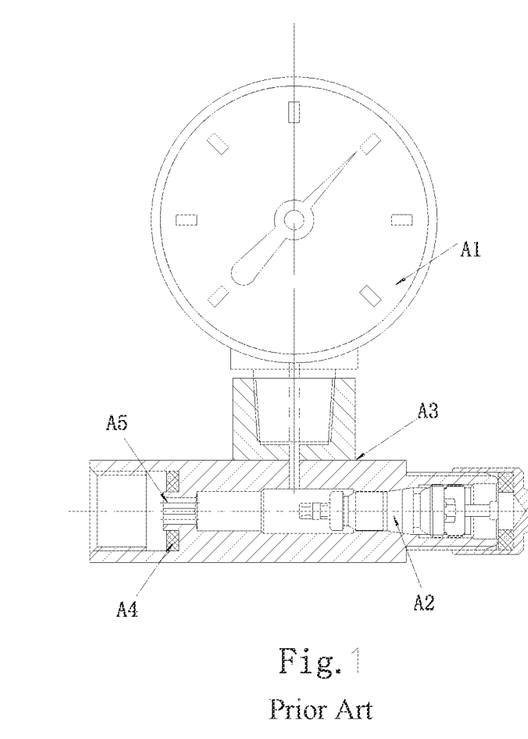
FIG. 1 to FIG. 5 show sectional views of a conventional external inflating valve loaded with different functional devices.
Figure 2:
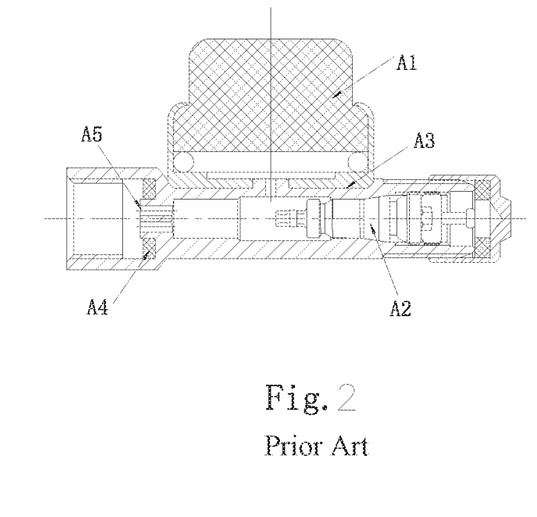
Figure 3:
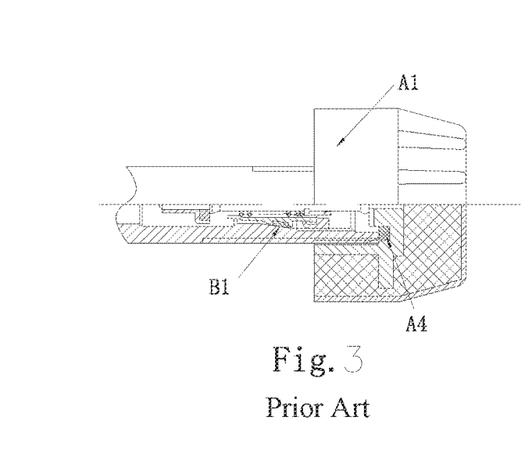
Figure 4:
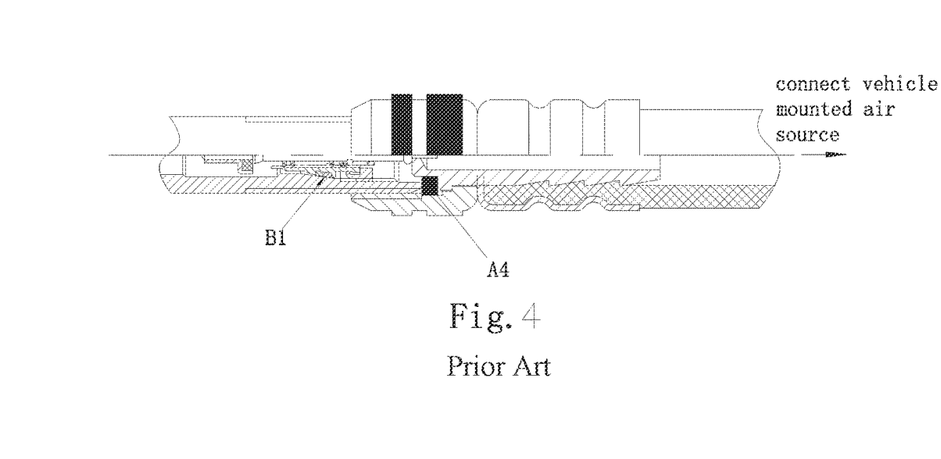
Figure 5:
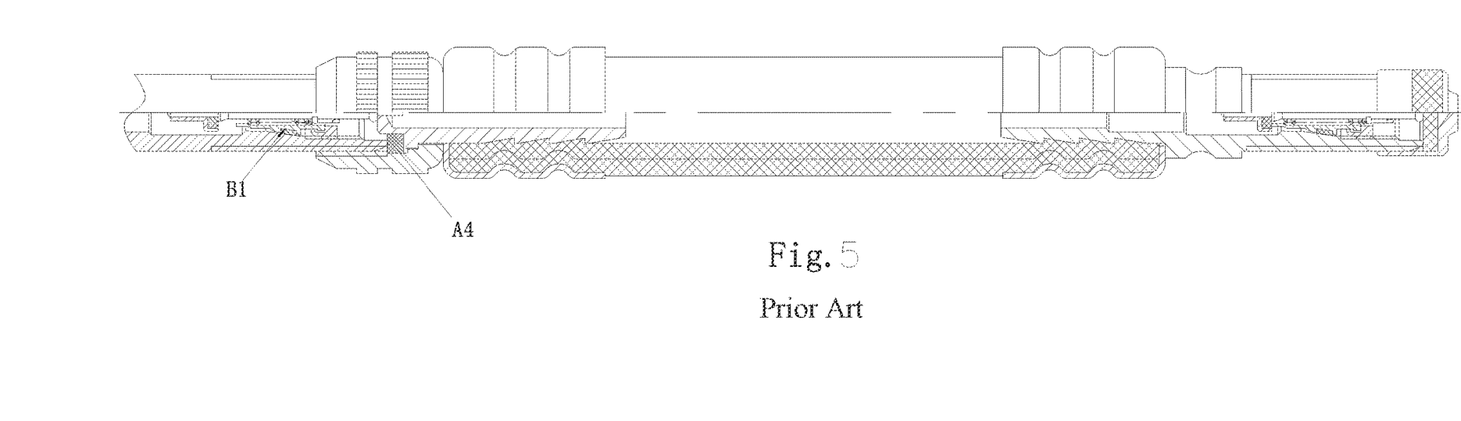
Figure 6:
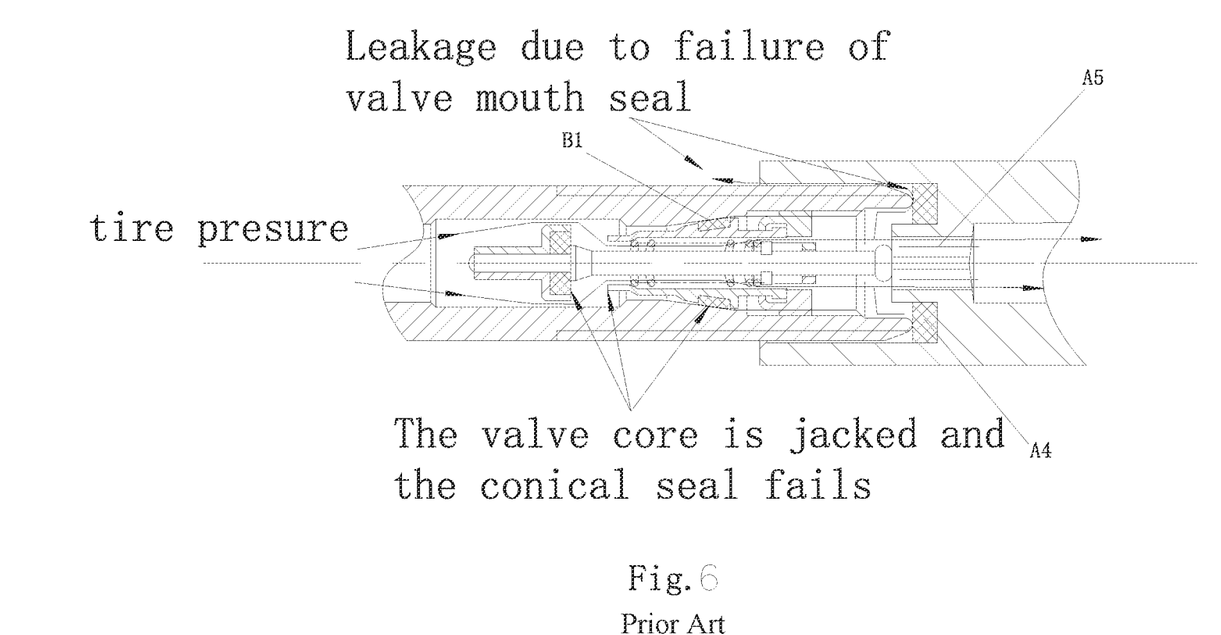
FIG. 6 shows a connection schematic diagram of a conventional external inflating valve and an original tire inflating valve.

For motor vehicles (especially commercial vehicles), an original tire inflating valve is often loaded with a tire pressure gauge (FIG. 1) for measuring a tire pressure, a sensor for monitoring a tire pressure (FIG. 2), and a cap type external sensor (FIG. 3), an automatic tire reinflating device (FIG. 4) and an inflation extension tube (FIG. 5), etc. Presently, these loading devices (as shown in FIG. 1 and FIG. 2) are carried by a welded external inflating valve, or (as shown in FIGS. 3 to 5) are directly mounted on the mouth of the tire inflating valve. The external inflating valve is directly connected to the original tire inflating valve. In the attached drawings 1 to 6 for description of prior art, A1 represents the loaded functional device, such as barometers, sensors, etc.; A2 represents the valve core in the external inflating valve; A3 is the welding part, and A4 is a built-in rubber flat gasket of an external loading part, and A5 is a push rod of an external loading part.

In the above structure, the connection between the external inflating valve and the original tire inflating valve is to push the valve core of the original tire inflating valve by a push rod A5 of the external connection part (FIG. 6), so that the tire air source can introduce into the loading part, which will produce an obvious failure (FIG. 6): Firstly, the main sealing function of the cone B1 of the original tire inflating valve core cavity is abandoned, and the sealing is achieved only relying on the inflating valve mouth and the built-in rubber flat gasket A4 of the external loading part. According to the sealing principle of the inflating valve, the PTFE pressure-resistant sealing ring of the valve core is combined with the conical surface provided in the inflating valve core cavity to achieve effective sealing and prevent the leakage of tire pressure. The above-mentioned sealing through the inflating valve mouth easily causes chronic tire pressure leakage due to the processing shape and roughness of the mouth and the permanent compression and deformation of the rubber flat washer; secondly, the inner spring of the valve core is in a state of extreme compression for a long time, and the yielding deformation dysfunctions the check valve of the valve core.

In summary, the valve cores are in a normally open state after the above loading parts are connected to the inflating valve (the sealing functions of the sealing cone defined by the inflating valve is abandoned), which causes the defects of failure of sealing functions and inconvenient operation of inflating valve, etc.

In addition, for the external inflating valve, one part is for one purpose, and the loading function is single, the inflating and deflating are inconvenient and the applicability is poor. Welding is often used for connection, and the processing technology is complicated and the reliability is poor.

SUMMARY

The present invention aims to solve the technical problem of providing a multifunctional external inflating valve which is capable of avoiding problems of external inflating valves in the part, and effectively preventing tire pressure leakage. To this end, the present invention adopts the following technical solutions:

A multifunctional external inflating valve, which comprises an inflating valve body, wherein the inflating valve body is provided with a three-way through main body; the main body is provided with an axial middle hole and a middle side surface connecting part, and is through from a side surface by means of the side surface connecting part; and the side surface connecting part is used for connecting a loading device.

A valve core is arranged in the axial middle hole, and the valve core is provided with a valve core body.

A hole cavity is formed in the front portion of the axial middle hole of the main body, and the hole cavity is provided with internal threads used for being connected to an original tire inflating valve.

An outer conical surface is arranged on the front portion of the core. The front portion, comprising the outer conical surface, of the core protrudes out of the front end of the hole cavity of the main body. An core conical surface sealing rubber pipe is mounted on the outer conical surface of the core and used for sealing the core and a conical hole sealing surface of a tire inflating valve inner hole cavity. An axial through hole is formed in the core.

The tail end of the main body is processed and formed according to sizes of the core cavity and threads of the inflating valve, and the valve core is mounted thereon.

On the basis of the technical solution, the present invention can also adopt the following further technical solutions, or combines and uses the further technical solutions:

The side surface connecting part is a connecting hole or threaded connecting column. A sealing ring accommodation groove is formed in the opening of the connecting hole. A through hole is formed in the threaded connecting column to pass through the axial middle hole from the side surface.

The hole cavity of the main body comprises an inner cylinder portion. The valve core is mounted in a core holder. The core holder is mounted in the position of the inner cylinder of the hole cavity of the main body in an interference fit manner. The core is mounted in the core holder.

The external inflating valve is provided with a core sealing ring, and the core sealing ring is mounted in a core sealing ring clamping groove to achieve sealing of the tail part of the core.

A main cylinder and a clamping part are arranged at the rear part of the core and used for cooperating with the core holder to fix the core on the main body. A transition section is arranged at the front part of the main cylinder, and the transition section forms a mounting channel of the sealing ring after the core is assembled. The core holder is provided with an inner cylindrical surface, and the inner cylindrical surface and the main cylinder of the core are in clearance fit with mutual rotation. The outer conical surface of the core is arranged at the front end of the transition section.

A minimum cylinder end is arranged at the front end of the outer conical surface of the core. An outer cone formed by the outer conical surface of the core comprises a small-diameter end and a large-diameter end, and an annular groove is formed in the large-diameter end of the outer cone.

An "O"-shaped sealing ring is mounted in the position of a step at the front end of the inner cylinder in the hole cavity of the main body, to achieve secondary sealing of the mouth of the original tire inflating valve with the external inflating valve. The front end of the core holder after mounted is generally flush with the step.

Another technical problem to be solved by the present invention is to provide a mounting method of a loading device of an inflating valve. To this end, the present invention adopts the following technical solutions:

the mounting method of the loading device of the inflating valve, comprising steps of dissembling the valve core of the original tire inflating valve, and connecting outer threads of the original tire inflating valve with inner threads of the hole cavity of any one of the multifunctional external inflating valves. Due to the length of the transition section of the core, the front end of the core and a portion where the core conical surface sealing rubber pipe is arranged can be inserted into a part where a valve core is originally arranged, of the original tire inflating valve. The core conical surface sealing rubber pipe is capable of reclining on a conical hole sealing surface of an inflating valve core cavity. Therefore, an original sealing effect of the external inflating valve with the original tire inflating valve is achieved.

The loading device comprises a tire gauge, a sensor for monitoring tire pressure, a cap type external sensor, an automatic tire reinflating device and an inflation extension tube.

A vehicle tire (and rim) inflating valve is an accessory mounted according to standards, and has functions of filling, discharging and sealing air (or liquid) for a tire. The original tire inflating valve is loaded with the external inflating valve for carrying a pressure gauge, a tire pressure and temperature monitoring sensor, an automatic tire reinflating device, an inflation extension tube,etc., aiming at adding functions such as convenience in inflation and deflation, maintenance of tire pressure, and tire pressure and temperature monitoring. By adopting the external inflating valve of the present invention, sealing and self-sealing of a sealing conical surface of an original inflating valve core cavity can be achieved by means of an end part core assembly, and tire pressure leakage can be effectively prevented. Meanwhile, the multifunctional external three-way inflating valve of the present invention is capable of loading functional parts such as different connectors, pressure gauges, sensors and automatic reinflating devices, so function diversity is sufficiently achieved. Due to interfaces in two directions, a gas (or liquid) can be charged or flows out in two directions conveniently. Meanwhile, the distance between a loading structure and the axis of the inflating valve is closer, and the dynamic balance performance is improved.

DETAILED DESCRIPTION

Example 1

Figure 7:
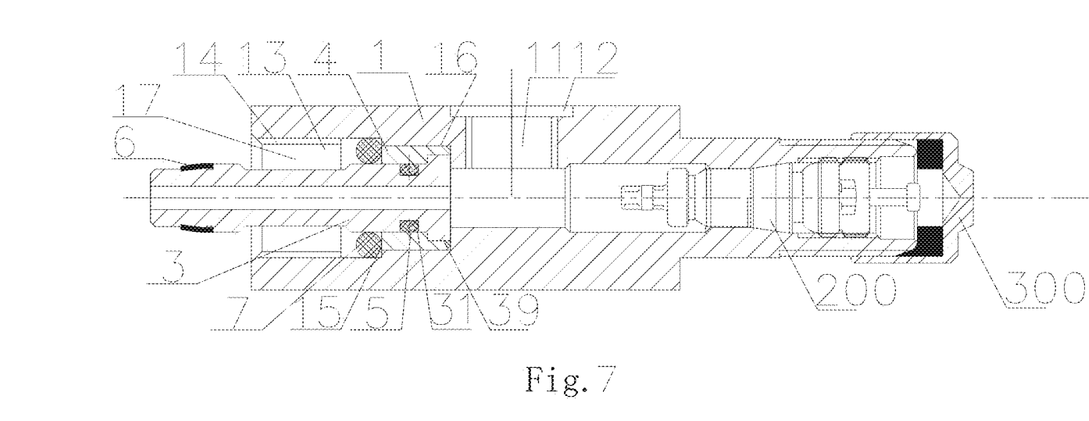
FIG. 7 shows a sectional view of Example 1 of the present invention.
Figure 9:
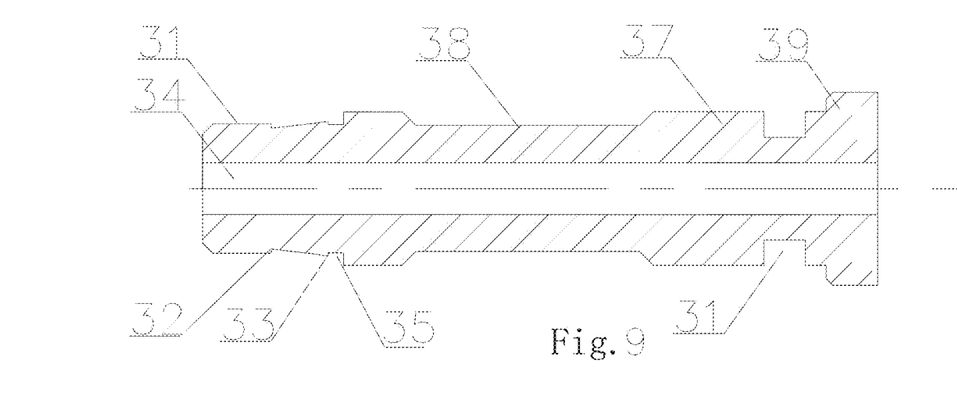
FIG. 9 shows a schematic diagram of a core of Example 1 of the present invention.
Figure 10:
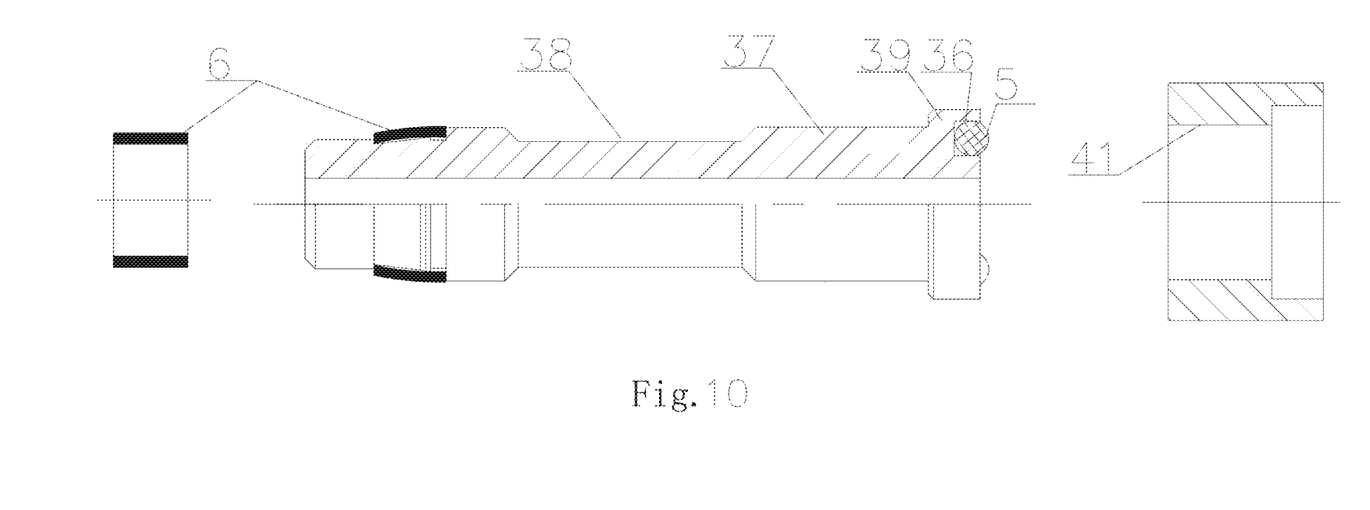
FIG. 10 shows an exploded view of Example 2 of the present invention.
Figure 11:
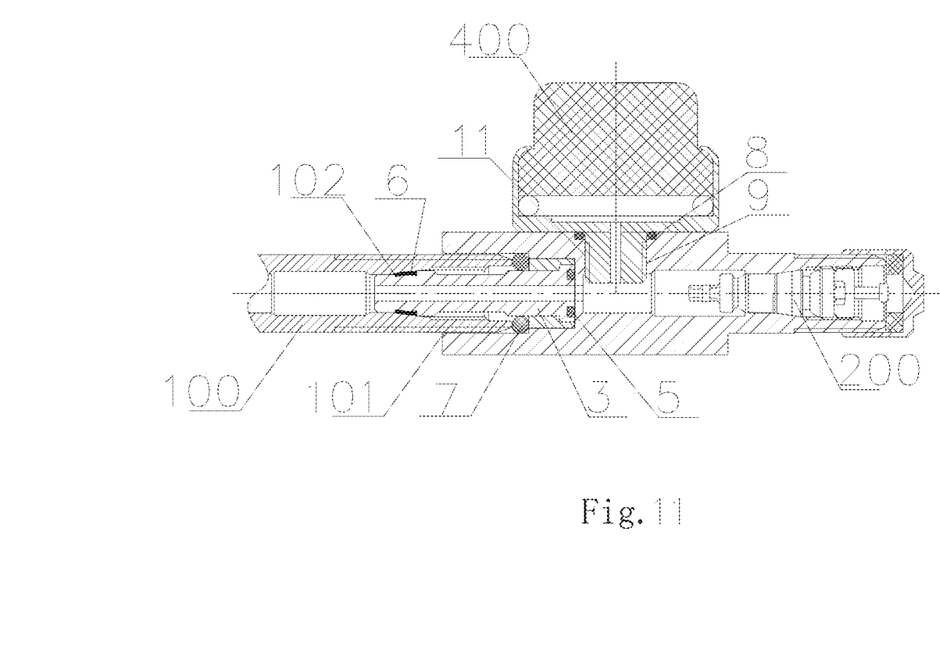
FIG. 11 shows a connection schematic diagram of an original tire inflating valve of the Example 2 of the present invention.

Referring to FIGS. 7 and 9, and also referring to FIGS. 10 and 11, an external inflating valve provided in this example, comprising a three-way through main body 1, a connecting hole 11 with metric threads (or NPT sealing tube threads) and a sealing ring accommodation groove 12 (used for connecting loading bodies) are arranged on a side surface of the main body 1, the sealing ring accommodation groove 12 is located in the opening of the connecting hole 11, and the groove is 1-1.5 mm in depth.

The connecting hole 11 is arranged in the middle of the main body 1, and the wall thickness of a position, corresponding to the connecting hole 11, of the main body 1 is larger than the wall thickness of the main body with a hole cavity 13 and also larger than the wall thickness of the main body with a valve core 200. The inner diameter of the position, corresponding to the connecting hole 11, of the main body 1 is smaller than the inner diameter of the hole cavity 13. When mounted, loading parts such as a TPMS sensor assembly 400 are mounted on the side surface connecting hole 11 of the main body 1 in a threaded connection manner, being sealed with an "O"-shaped sealing ring 8 and fastened with an thread sealant 9 (other loading parts are similarly connected). Therefore, a series of processing and inspection process that a sensor is mounted and fixed through spinning processing after a sensor base is welded with an external inflating valve is avoided. In addition, the loading parts are closer to the axis of the inflating valve, and the dynamic balance performance is improved.

A hole cavity 13 is formed in the front end of the main body 1, the hole cavity 13 is internally provided with 8V1 inner threads 14 used for being connected with an original tire inflating valve 100, and specifically, the inner threads 14 are in threaded connection with outer threads 101 of the original tire inflating valve 100.

A valve core 3 is arranged at the front end of the external inflating valve. The core 3 is mounted in a core holder 4. A core sealing ring 5 is mounted in a core sealing ring clamping groove 31 to achieve sealing of the tail part of the core 3. Specifically, the core sealing ring clamping groove 31 is arranged on a side surface of the core 3, and the core sealing ring 5 is located between the core 3 and the core holder 4.

The core 3 is provided with a main cylinder 37 with a diameter of 4.45-0.03 mm. A clamping part 39 is arranged at the rear part of the main cylinder 37 and is used for cooperating with the core holder 4 to fix the core 3 on the main body 1. A transition section 38 with a diameter of 3.7 mm is arranged at the front part of the main cylinder 37, and the transition section 38 forms a mounting channel 17 of a sealing ring 7 after the core 3 is assembled. The core holder 4 is provided with an inner cylindrical surface 41 of 4.5±0.03, and the inner cylindrical surface 41 is in clearance fit with the main cylinder 37 of the core 3 in mutual rotation. An outer conical surface of the core is arranged at the front end of the transition section 33.

The core holder 4 is mounted in the position of an inner cylinder 16 of a hole cavity 13 of the main body in an interference fit manner. The inner cylinder 16 is of 6.9-0.03 mm in diameter. The front portion, comprising the outer conical surface, of the core 3 protrudes out of the front end of the hole cavity 13 of the main body. A core conical surface sealing rubber pipe 6 is mounted on the outer conical surface of the core and used for sealing the core 3 and a conical hole sealing surface 102 of a tire inflating valve inner hole cavity. Therefore, an original sealing effect of the external inflating valve with the original tire inflating valve is achieved under the action of mounting torque.

A minimum cylinder end 31 with a diameter of 3.75-0.03 mm is arranged at the front end of the outer conical surface of the core 3. The diameter of a small-diameter end 32 of an outer cone formed by the outer conical surface of the core 3 is 3.5-0.05 mm, the diameter of a large-diameter end 33 is 3.88-0.03 mm, an angle is 14 degrees, a groove 35 with a diameter of 3.72*0.45 mm is formed in the large-diameter end of the outer cone, and the length of the groove and the outer cone in the axial direction of the external inflating valve is 2.1 mm. A central hole 34 with a diameter of 1-2 mm is formed in the core 3 in a through manner.

An "O"-shaped sealing ring 7 is mounted in the position of a step 15 at the front end of the inner cylinder 16 in the hole cavity 13 of the main body, to achieve secondary sealing of the mouth of the original tire inflating valve with the external inflating valve. The front end of the core holder 4 after mounted is generally flush with the step 15.

The tail end of the main body 1 is processed and formed according to sizes of the core cavity and threads of a standard inflating valve, and a common valve core 200 and a protective cap 300 are mounted thereon.

The core conical surface sealing rubber pipe 6 is made of a polytetrafluoroethylene material, and the "O"-shaped sealing ring is made of a silicone rubber or hydrogenated nitrile rubber. Sizes of the core conical surface sealing rubber pipe 6 are that the outer diameter is 3.9±0.03 mm, the wall thickness is 0.33 mm, the length is 2.16±0.04 mm, and the distance between the core conical surface sealing rubber pipe 6 mounted on the core and the core holder 4 is 11-0.20 mm.

During mounting, the core of the original tire inflating valve is disassembled, then the external inflating valve of the present invention is mounted on the original tire inflating valve 100. Due to the length of the transition section 38 of the core 3, the front end of the core 1 and a portion where the core conical surface sealing rubber pipe 6 is arranged can be inserted into a part where a valve core is originally arranged. The core conical surface sealing rubber pipe 6 is capable of reclining on a conical hole sealing surface 102 of an inflating valve core cavity. With a mounting torque<0.1 N.m, the core 3, the core conical surface sealing rubber pipe 6 and the conical hole sealing surface 102 of the inflating valve core cavity are in a mutual rotation and gradual compression process. When the torque is gradually increased, the core is rotated and presses vertically in the core holder, and is mounted in place when the mounting torque is 0.3-0.45 N.m, and the conical hole sealing surface 102 of the tire inflating valve core cavity and the core conical surface sealing rubber pipe 6 are sealed to achieve the original sealing effect of the external inflating valve with the original tire inflating valve. In addition, due to distance fit of the step 15 and the outer conical surface of the core 3, the "O"-shaped sealing 7 is also compressed by the end part of the original tire inflating valve and the step 15 to achieve secondary sealing at the moment. Therefore, not only is a good sealing effect achieved, that is, original sealing functions and effects can be achieved by the inflating valve, but also the total mass is relatively low.

Example 2

Figure 8:
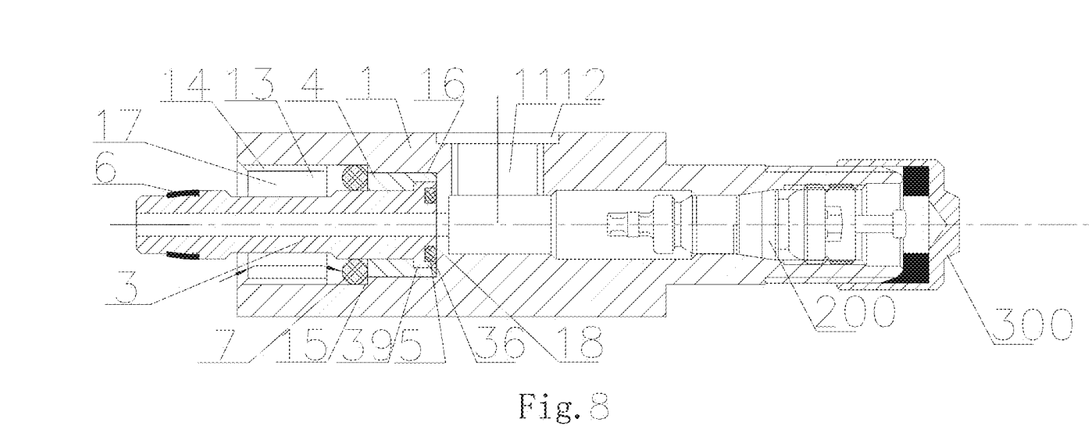
FIG. 8 shows a sectional view of Example 2 of the present invention.

Referring to FIGS. 8, 10 and 11, and also referring to FIG. 9, in this example, compared with Example 1, sealing of the tail part of the core 3 is modified, others are identical to those of Example 1, and mark numbers of Example 2, identical to those of Example 1, represent same meanings.

For sealing of the tail part of the core 3, the core sealing ring 5 is mounted in the core sealing ring clamping groove 36 to achieve sealing of the tail part of the core 3. Specifically, the core sealing ring clamping groove 36 is arranged on the tail end surface of the core, and the core sealing ring 5 is located between the tail end of the core 3 and a step 18 in the external inflating valve main body.

Example 3

Figure 12:
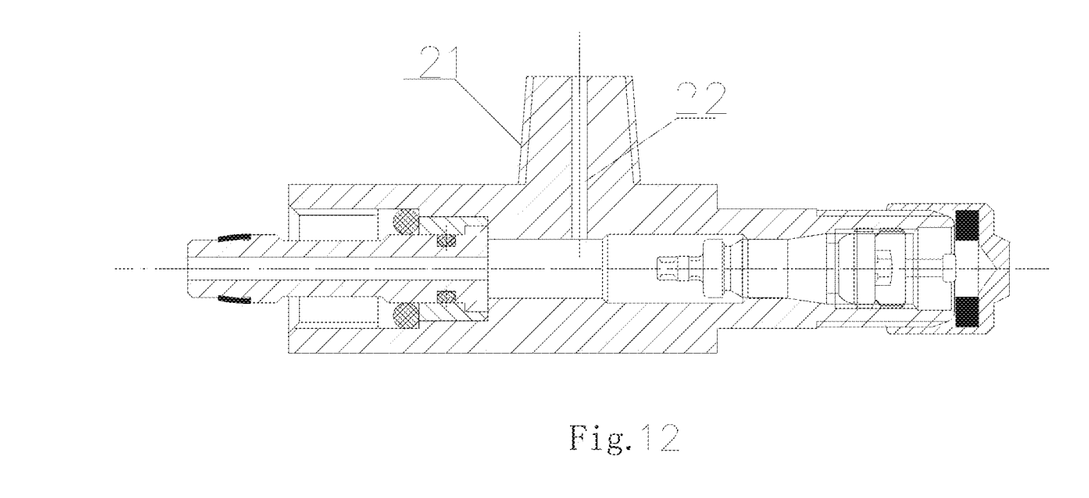
FIG. 12 shows a sectional view of Example 3 of the present invention.

Referring to FIG. 12, and also referring to FIGS. 9, 10 and 11, in this example, a connecting threaded column 21 with metric threads (or NPT sealing tube threads) is arranged on a side surface of the external inflating valve main body 2, and is used for connecting loading bodies, and in addition, a through hole 22 of 1-2 mm is formed in the threaded column.

Other parts of this example are the same as those of Example 1.

Example 4

Figure 13:
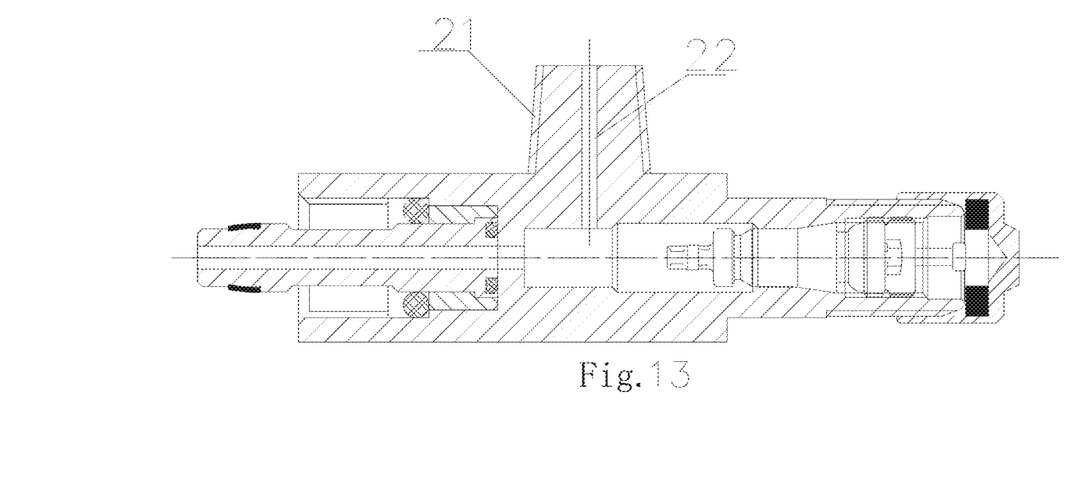
FIG. 13 shows a sectional view of Example 4 of the present invention.

Referring to FIG. 13, and also referring to FIGS. 9, 10 and 11, in this example, a connecting threaded column 21 with metric threads (or NPT sealing tube threads) is arranged on a side surface of the external inflating valve main body 2, and is used for connecting loading bodies, and in addition, a through hole 22 of 1-2 mm is formed in the threaded column.

Other parts of this example are the same as those of Example 2.

The following are results verified by type tests, taking Example 2 as an example:

(I) Vibration test: the test is carried out on an electric vibration testing machine. The connection port of the three-way inflating valve of the present invention is loaded with a sensor with a mass of 20 g, and is axially fixed on a test fixture in the same direction as test displacement, at a frequency of 8-10 Hz and a displacement amplitude of 15 mm, sinusoidal vibration is carried out for 2 minutes for 3 times, the three-way inflating valve is disassembled, and observation shows that a loading body has no looseness and displacement.

(II) Sealing test: the three-way inflating valve (together with a loading part) after the vibration test is mounted on a sealing test fixture with a torque of 0.3-0.45 N.m, put into a water tank together with the test fixture at a room temperature, and inflated with air pressure of 1.4 Mpa, and the test result after observation of 60 seconds shows that no bubble is caused. A product qualified in a room temperature test together with fixtures and ethanol for test are put into a cryogenic box at (minus 40° C. to 5° C.), compressed air of constant pressure of 0.85 Mpa at a low temperature is introduced in the test for 24 hours, and observation of 60 seconds shows that no bubble is caused. A product qualified in a low temperature test together with fixtures are put into a high-temperature cabinet at 100+5° C. for 24 hours, taken out and soaked into water of (60±5° C.), compressed air of constant pressure of 0.85 Mpa is introduced, and observation of 60 seconds shows that no bubble is caused. After the sealing test is completed, the three-way inflating valve is disassembled, and observation shows that the core sealing ring is not broken or wrinkled.

The above descriptions are merely the specific embodiments of the present invention, but the structural features of the present invention are not limited thereto. Any changes or modifications made by those skilled in the art shall fall within the scope of protection of the present invention.

The invention claimed is:

1. A multifunctional external inflating valve, which comprises an inflating valve body, wherein the inflating valve body is provided with a three-way through main body; the main body is provided with an axial middle hole and a middle side surface connecting part penetrating a side surface of the main body to connect the axial middle hole; and the side surface connecting part is used for connecting a loading device;
   a valve core is arranged in the axial middle hole, and the valve core is provided with a valve core body;
   a hole cavity is formed in a front portion of the axial middle hole of the main body, and the hole cavity is provided with internal threads used for being connected to an original tire inflating valve;
   an outer conical surface is arranged on a front portion of the core, the front portion of the core and the outer conical surface protrude out of a front end of the hole cavity of the main body, an core conical surface sealing rubber pipe is mounted on the outer conical surface of the core and used for sealing the core and a conical hole sealing surface of a tire inflating valve inner hole cavity, an axial through hole is formed in the core;
   a tail end of the main body is processed and formed according to sizes of the core cavity and threads of the inflating valve, and the valve core is mounted thereon.

2. The multifunctional external inflating valve according to claim 1, wherein the side surface connecting part is a connecting hole or threaded connecting column; wherein the side surface connecting part is the connecting hole, a sealing ring accommodation groove is formed in an opening of the connecting hole; when the side surface connecting part is the threaded connecting column, a through hole is formed in the threaded connecting column to pass through the axial middle hole from the side surface.

3. The multifunctional external inflating valve according to claim 1, wherein the hole cavity of the main body comprises an inner cylinder portion; the valve core is mounted in a core holder, the core holder is mounted in the inner cylinder portion of the hole cavity of the main body, and the core is mounted in the core holder.

4. The multifunctional external inflating valve according to claim 1, wherein the external inflating valve is provided with a core sealing ring, and the core sealing ring is mounted in a core sealing ring clamping groove to achieve sealing of the tail end of the core.

5. The multifunctional external inflating valve according to claim 3, wherein a main cylinder and a clamping part are arranged at the rear part of the core and used for cooperating with the core holder to fix the core on the main body, a transition section is arranged at a front part of the main cylinder, and the transition section forms a mounting channel of the sealing ring after the core is assembled; the core holder is provided with an inner cylindrical surface, and the inner cylindrical surface is coupled with the main cylinder of the core to allow a mutual rotation; the outer conical surface of the core is arranged at the front end of the transition section.

6. The multifunctional external inflating valve according to claim 3, wherein a minimum cylinder end is arranged at the front end of the outer conical surface of the core, an outer cone formed by the outer conical surface of the core comprises a small-diameter end and a large-diameter end, and an annular groove is formed in the large-diameter end of the outer cone.

7. The multifunctional external inflating valve according to claim 3, wherein an "0"-shaped sealing ring is mounted in the position of a step at the front end of the inner cylinder in the hole cavity of the main body, to achieve secondary sealing of the mouth of the original tire inflating valve with the external inflating valve; the front end of the core holder after mounted is flush with the step.

8. A mounting method of a loading device of an inflating valve, comprising steps of disassembling the valve core of the original tire inflating valve, and connecting outer threads of the original tire inflating valve with inner threads of the hole cavity of any one of the multifunctional external inflating valves of claim 1, by making use of the length of a transition section of the core, the front end of the core and a portion where the core conical surface sealing rubber pipe is arranged are inserted into a part where a valve core is originally arranged, of the original tire inflating valve, the core conical surface sealing rubber pipe is capable of reclining on a conical hole sealing surface of an inflating valve core cavity; an original sealing effect of the external inflating valve with the original tire inflating valve is achieved.

9. The mounting method of a loading device of an inflating valve according to claim 8, wherein the loading device comprises a tire gauge, a sensor for monitoring tire pressure, a cap type external sensor, an automatic tire reinflating device and an inflation extension tube.

* * * * *